US012682387B2

(12) United States Patent
Matsuura

(10) Patent No.: US 12,682,387 B2
(45) Date of Patent: Jul. 14, 2026

(54) INFORMATION PROCESSING APPARATUS AND METHOD FOR DETERMINING A PRODUCT TO BE PURCHASED

(71) Applicant: NEC Platforms, Ltd., Kawasaki (JP)

(72) Inventor: Hideki Matsuura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 99 days.

(21) Appl. No.: 18/685,274

(22) PCT Filed: Feb. 14, 2022

(86) PCT No.: PCT/JP2022/005645
§ 371 (c)(1),
(2) Date: Feb. 21, 2024

(87) PCT Pub. No.: WO2023/037578
PCT Pub. Date: Mar. 16, 2023

(65) Prior Publication Data
US 2025/0124425 A1     Apr. 17, 2025

(30) Foreign Application Priority Data

Sep. 7, 2021     (JP) ................................. 2021-145360

(51) Int. Cl.
*G06Q 30/0601* (2023.01)
*G06K 7/10* (2006.01)
*G06K 19/077* (2006.01)

(52) U.S. Cl.
CPC ..... *G06Q 30/0633* (2013.01); *G06K 7/10366* (2013.01); *G06K 19/07758* (2013.01); *G06Q 30/0623* (2013.01)

(58) Field of Classification Search
CPC ........................................ G06Q 30/0601–0645
(Continued)

(56) References Cited

U.S. PATENT DOCUMENTS

2009/0101713 A1*  4/2009  Ulrich ................ G06K 7/10435
                                                             235/383
2017/0372562 A1*  12/2017  Terahara .............. G06Q 20/202
(Continued)

FOREIGN PATENT DOCUMENTS

JP          H10-049756 A      2/1998
JP          2010-033274 A     2/2010
(Continued)

OTHER PUBLICATIONS

K. Wankhede, B. Wukkadada and V. Nadar, "Just Walk-Out Technology and its Challenges: A Case of Amazon Go," 2018 International Conference on Inventive Research in Computing Applications (ICIRCA), Coimbatore, India, 2018, pp. 254-257, doi: 10.1109/ICIRCA.2018.8597403.*
(Continued)

*Primary Examiner* — Resha Desai

(57) ABSTRACT

An information processing apparatus includes: a gate data acquisition unit that acquires product identification information and basket identification information that have been read by a gate sensor; a storage control unit that controls the basket identification information and the product identification information that have been read together by the gate sensor to be stored in a storage device in association with each other; a work table data acquisition unit that acquires product identification information and basket identification information that have been read by a work table sensor; and a purchased product determination unit that determines whether the product to be identified by the product identification information that has been read by the work table sensor is the product to be purchased, based on the basket identification information that has been read by the work table sensor and information stored in the storage device.

6 Claims, 12 Drawing Sheets

(58) Field of Classification Search
USPC ................................................ 705/26.1–27.2
See application file for complete search history.

(56)                    References Cited

U.S. PATENT DOCUMENTS

2020/0226331 A1 *    7/2020  Khojastepour  ....  G06K 7/10128
2021/0272174 A1      9/2021  Fujisawa

FOREIGN PATENT DOCUMENTS

| | | |
|---|---|---|
| JP | 2016-053794 A | 4/2016 |
| JP | 2017-097644 A | 6/2017 |
| JP | 2019-113906 A | 7/2019 |
| JP | 2021-043847 A | 3/2021 |
| JP | 2021-068156 A | 4/2021 |
| WO | 2012/120627 A1 | 9/2012 |

OTHER PUBLICATIONS

Japanese Office Communication for JP Application No. 2021-145360 mailed on Feb. 13, 2024 with English Translation.
JP Office Action for JP Application No. 2024-033720, mailed on Feb. 18, 2025 with English Translation.
Japanese Office Communication for JP Application No. 2021-145360 mailed on Feb. 2024 with English Translation.
International Search Report for PCT Application No. PCT/JP2022/005645, mailed on Apr. 5, 2022.

\* cited by examiner

100

INFORMATION PROCESSING APPARATUS AND METHOD FOR DETERMINING A PRODUCT TO BE PURCHASED

This application is a National Stage Entry of PCT/JP2022/005645 filed on Feb. 14, 2022, which claims priority from JP Patent Application 2021-145360 filed on Sep. 7, 2021, the contents of all of which are incorporated herein by reference, in their entirety.

TECHNICAL FIELD

The present invention relates to an information processing apparatus, an information processing system, an information processing method, and a program.

BACKGROUND ART

In these years, a technology of making a payment using a radio frequency identifier (RFID) tag attached to a product is gathering attention. For example, Patent Literature 1 discloses an electronic tag reading device that reads an RFID tag at a gate through which a user passes and that determines a product to be purchased by the user.

CITATION LIST

Patent Literature

Patent Literature 1: Japanese Unexamined Patent Application Publication No. 2021-68156

SUMMARY OF INVENTION

Technical Problem

The device described in Patent Literature 1 is highly convenient, because a product to be purchased is automatically determined. However, in a case where a product in a shopping basket is read by an antenna provided at a gate, there is a possibility that missing of reading occurs. Here, the missing of reading means that reading processing fails for an RFID tag that has to be read. This missing of reading occurs resulting from radio waves used for reading being disturbed or the like by a product having a blocking characteristic and that is disorderly put in a shopping basket. Examples of the product having the blocking characteristic include a product containing metal such as a canned beverage or an accessory, a product containing liquid such as a plastic bottle drink, and the like.

In this manner, in the case of reading the product in the shopping basket with the antenna provided at the gate and determining the product to be purchased, the determination may not be made appropriately because of an occurrence of missing of reading.

Therefore, an object to be achieved by example embodiments disclosed in the present specification is to provide an information processing apparatus, an information processing system, an information processing method, and a program that are highly convenient and that are capable of appropriately determining a product to be purchased.

Solution to Problem

An information processing apparatus according to a first aspect includes:

gate data acquisition means for acquiring product identification information stored in an RFID tag attached to a product and basket identification information stored in an RFID tag attached to a shopping basket, the product identification information and the basket identification information having been read by a gate sensor that is a sensor provided at a gate through which a shopper passes;

storage control means for controlling the basket identification information and the product identification information that have been read together by the gate sensor to be stored in a storage device in association with each other;

work table data acquisition means for acquiring product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and purchased product determination means for determining whether the product to be identified by the product identification information that has been read by the work table sensor is the product to be purchased, based on the basket identification information that has been read by the work table sensor and information stored in the storage device.

An information processing system according to a second aspect includes:

a gate sensor that is a sensor provided at a gate through which a shopper passes;

a work table sensor that is a sensor provided in a work table on which the shopper puts a product to be purchased into a container used by the shopper to bring back the product from a store; and an information processing apparatus, wherein the information processing apparatus includes:

gate data acquisition means for acquiring product identification information stored in an RFID tag attached to a product and basket identification information stored in an RFID tag attached to a shopping basket, the product identification information and the basket identification information having been read by the gate sensor;

storage control means for controlling the basket identification information and the product identification information that have been read together by the gate sensor to be stored in a storage device in association with each other;

work table data acquisition means for acquiring product identification information stored in an RFID tag attached to a product and basket identification information stored in an RFID tag attached to a shopping basket, the product identification information and the basket identification information having been read by the work table sensor; and purchased product determination means for determining whether the product to be identified by the product identification information that has been read by the work table sensor is the product to be purchased, based on the basket identification information that has been read by the work table sensor and information stored in the storage device.

An information processing method according to a third aspect includes:

acquiring product identification information stored in an RFID tag attached to a product and basket identification information stored in an RFID tag attached to a shopping basket, the product identification information and the basket identification information having been read by a gate sensor that is a sensor provided at a gate through which a shopper passes;

controlling the basket identification information and the product identification information that have been read together by the gate sensor to be stored in a storage device in association with each other;

acquiring product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and determining whether the product to be identified by the product identification information that has been read by the work table sensor is the product to be purchased, based on the basket identification information that has been read by the work table sensor and information stored in the storage device.

A program according to a fourth aspect causes a computer to execute:

a gate data acquisition step of acquiring product identification information stored in an RFID tag attached to a product and basket identification information stored in an RFID tag attached to a shopping basket, the product identification information and the basket identification information having been read by a gate sensor that is a sensor provided at a gate through which a shopper passes;

a storage control step of controlling the basket identification information and the product identification information that have been read together by the gate sensor to be stored in a storage device in association with each other;

a work table data acquisition step of acquiring product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and a purchased product determination step of determining whether the product to be identified by the product identification information that has been read by the work table sensor is the product to be purchased, based on the basket identification information that has been read by the work table sensor and information stored in the storage device.

Advantageous Effects of Invention

According to the above aspects, it is possible to provide an information processing apparatus, an information processing system, an information processing method, and a program that are highly convenient and that are capable of appropriately determining a product to be purchased.

EXAMPLE EMBODIMENT

Outline of Example Embodiments

Figure 1:
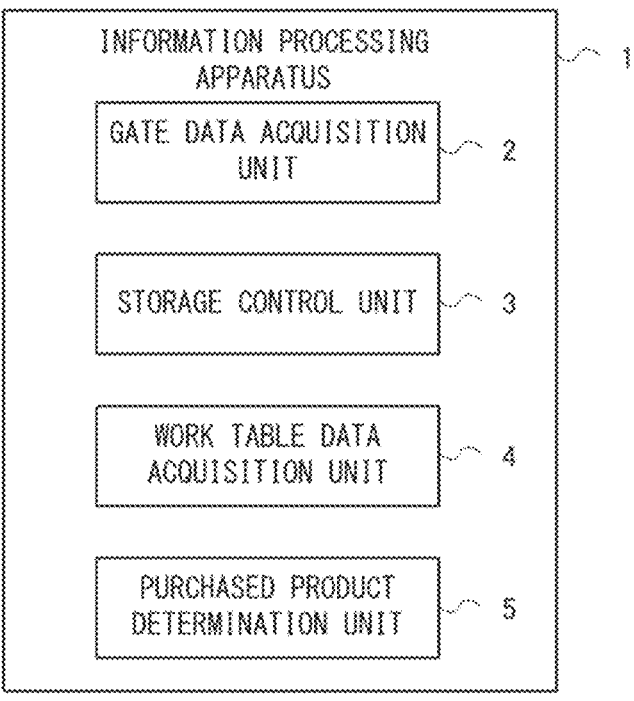
FIG. 1 is a block diagram illustrating an example of a configuration of an information processing apparatus according to an outline of an example embodiment.

Prior to the detailed description of example embodiments, an outline of the example embodiments will be described. FIG. 1 is a block diagram illustrating an example of a configuration of an information processing apparatus 1 according to an outline of an example embodiment. As illustrated in FIG. 1, the information processing apparatus 1 includes a gate data acquisition unit 2, a storage control unit 3, a work table data acquisition unit 4, and a purchased product determination unit 5. Note that an RFID tag is attached beforehand to a product to be determined by the information processing apparatus 1 as to whether a product is to be purchased, and an RFID tag is also attached beforehand to a shopping basket into which a shopper puts the product to be purchased.

The gate data acquisition unit 2 acquires product identification information and basket identification information that have been read by a gate sensor. Here, the gate sensor is a sensor provided at a gate through which shoppers pass, communicates with an RFID tag, and receives a signal including information stored in the RFID tag from the RFID tag. In addition, the product identification information to be read by the gate sensor is information stored in the RFID tag attached to the product, and is an identifier for identifying the product. The product identification information is different for every individual product. The basket identification information to be read by the gate sensor is information stored in the RFID tag attached to the shopping basket, and is an identifier for identifying the shopping basket. The basket identification information is different for every individual shopping basket.

The storage control unit 3 controls the basket identification information and the product identification information that have been read together by the gate sensor to be stored in a storage device in association with each other. Here, the basket identification information and the product identification information that have been read together denotes the basket identification information and the product identification information that have been read simultaneously by the gate sensor of an identical gate. Note that being read simultaneously does not mean that reading timings are completely the same, but means that the reading is performed in a predetermined period of time regarded as being simultaneous. In a case where either one of the basket identification information or the product identification information is read by the gate sensor, the storage control unit 3 controls only the information that has been read to be stored in the storage device. Note that in a case where a shopper puts a plurality of products into a shopping basket, a plurality of pieces of product identification information are read by the gate sensor. In addition, in a case where a shopper uses a plurality of shopping baskets, a plurality of pieces of basket identification information are read. In a case where the plurality of pieces of basket identification information are read, the storage control unit 3 controls the product identification information that has been read together with the basket identification information to be stored in the storage device in association with the plurality of pieces of basket identification information that have been read. Note that the storage device may be included in the information processing apparatus 1, or may be a device outside the information processing apparatus 1.

The work table data acquisition unit 4 acquires the product identification information and the basket identification information that have been read by a work table sensor. Here, the work table sensor is a sensor provided in a work table on which a shopper puts a product to be purchased into a container used by the shopper to bring back the product from a store. The work table sensor communicates with the RFID tag, and receives a signal including information stored in the RFID tag from the RFID tag. In addition, the product identification information to be read by the work table sensor is information stored in the RFID tag attached to the product, and is the identifier for identifying the product as described above. Similarly, the basket identification information to be read by the work table sensor is information stored in the RFID tag attached to the shopping basket, and is the identifier for identifying the shopping basket as described above. Note that in the following description, the container used by the shopper to bring back the product from the store will be referred to as a bag.

The purchased product determination unit 5 determines whether the product identified by the product identification information that has been read by the work table sensor is a product to be purchased. The purchased product determination unit 5 makes determination, based on the basket identification information that has been read by the work table sensor and the information stored in the storage device by the storage control unit 3.

In this manner, the information processing apparatus 1 determines the product to be purchased by using the information that has been read by the gate sensor and the information that has been read by the work table sensor. Accordingly, the product to be purchased can be determined in a more accurate manner. In addition, reading by the gate sensor is enabled by the shopper simply passing through the gate. In addition, reading by the work table sensor is enabled by the shopper simply putting the purchased product into a bag. Accordingly, the information processing apparatus 1 is highly convenient. In this manner, the information processing apparatus 1 is highly convenient, and is capable of appropriately determining the product to be purchased.

First Example Embodiment

Figure 2:
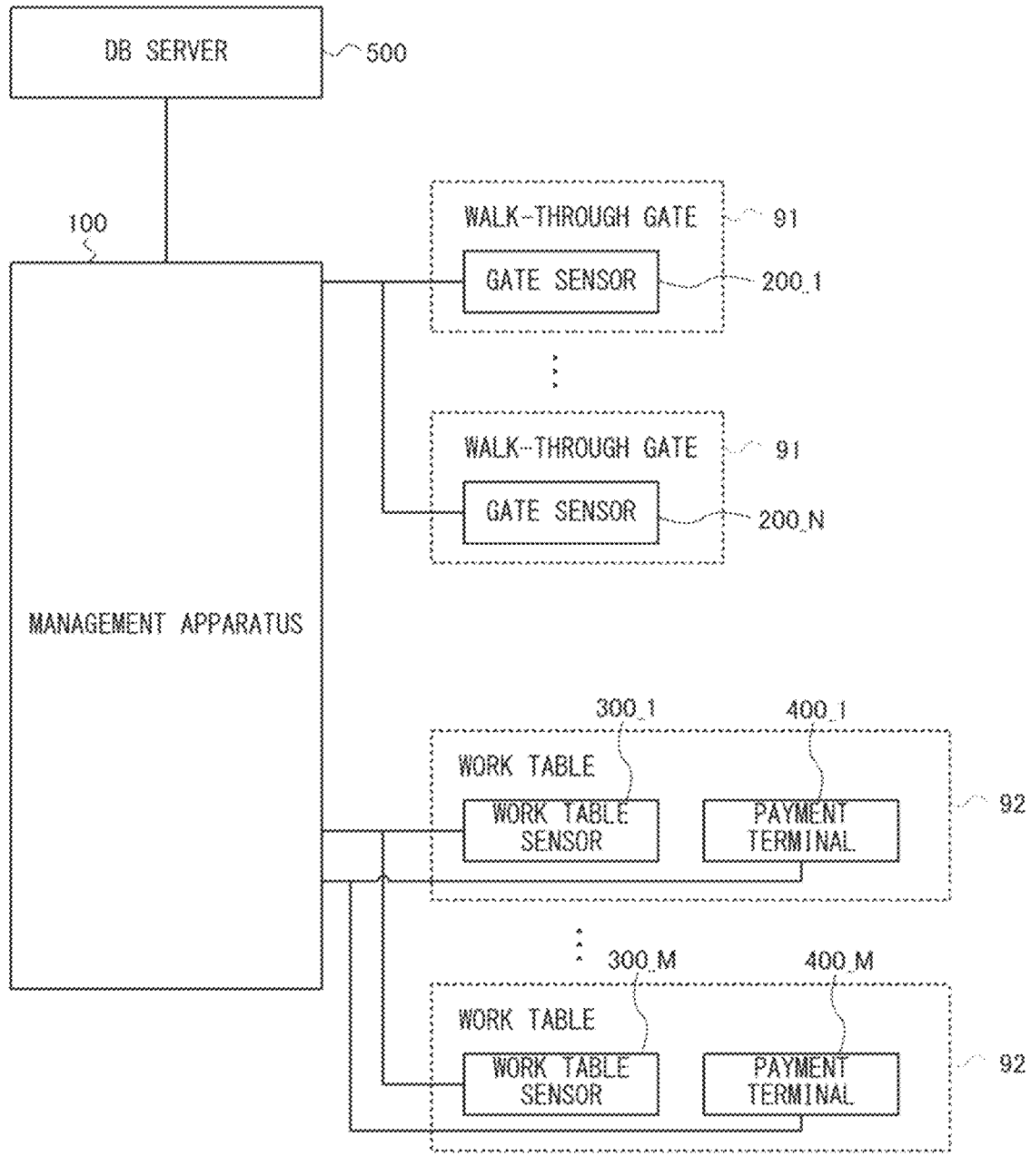
FIG. 2 is a block diagram illustrating an example of a configuration of an information processing system according to an example embodiment.

Next, details of an example embodiment will be described. FIG. 2 is a block diagram illustrating an example of a configuration of an information processing system 10 according to an example embodiment. The information processing system 10 includes a management apparatus 100, gate sensors 200_1 to 200_N, work table sensors 300_1 to 300_M, payment terminals 400_1 to 400_M, and a DB server 500. Hereinafter, the gate sensors 200_1 to 200_N will be referred to as the gate sensor 200, when describing them without distinguishing among them in particular. In addition, the work table sensors 300_1 to 300_M will be referred to as the work table sensor 300, when describing them without distinguishing among them in particular. Furthermore, the payment terminals 400_1 to 400_M will be referred to as the payment terminal 400, when describing them without distinguishing among them in particular. The information processing system 10 may include one gate sensor 200, or may include a plurality of gate sensors 200. Similarly, the information processing system 10 may include one set of the work table sensor 300 and the payment terminal 400, or may include a plurality of sets of the work table sensors 300 and the payment terminals 400. The management apparatus 100 is connected with the gate sensor 200, the work table sensor 300, the payment terminal 400, and the DB server 500 so as to be capable of communicating with them in a wired or wireless manner.

Figure 3:
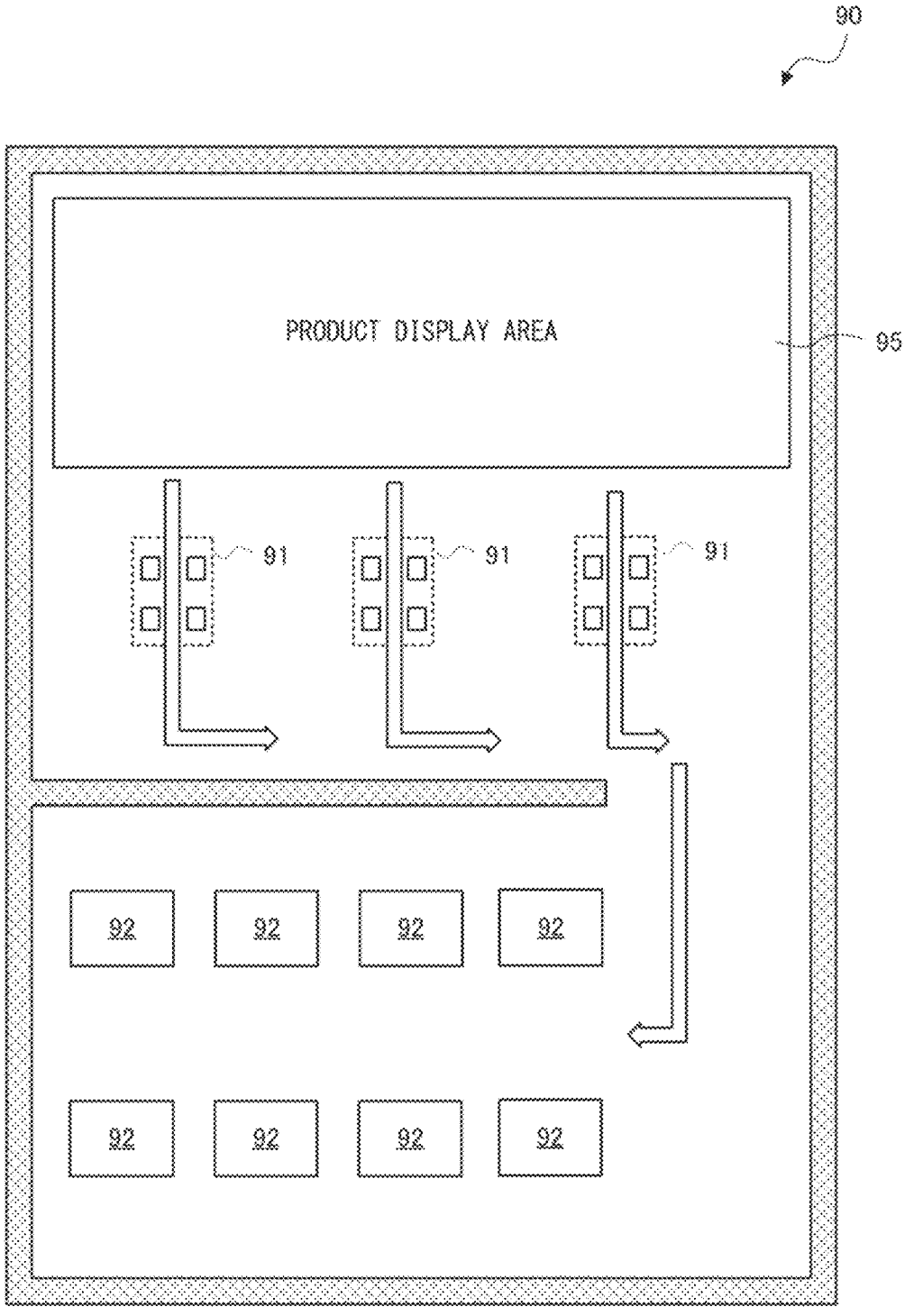
FIG. 3 is a schematic diagram illustrating an arrangement example of a plurality of walk-through gates and a plurality of work tables in a store that sells products.

Here, in particular, the gate sensor 200 is installed in a walk-through gate 91, and the work table sensor 300 and the payment terminal 400 are installed in a work table 92. FIG. 3 is a schematic diagram illustrating an arrangement example of a plurality of the walk-through gates 91 and a plurality of the work tables 92 in a store 90 that sells products. Note that in FIG. 3, moving routes of shoppers are indicated by arrows. The walk-through gate 91 is a gate through which a shopper who has finished selecting a product or products that the shopper likes to purchase passes, and is disposed partway in the moving routes from a product display area 95, which is an area where products are displayed, to the work tables 92. For example, the shopper passes through the walk-through gate 91 while holding the shopping basket containing the product(s). Note that the shopper does not necessarily have to use the shopping basket. The shopper who has passed through the walk-through gate 91 moves to the work table 92. The work table 92 is a table for putting the product(s) to be purchased into a bag, and is a so-called bagging table. Note that the bag here is a container used by a shopper to bring back the product(s) from the store 90, and may be, for example, a plastic bag supplied by the store or a bag brought by the shopper. The shopper who has put the product(s) into the bag on the work table 92 and then has made a payment of the product(s) leaves the work table 92, and brings back the product(s).

Figure 6:
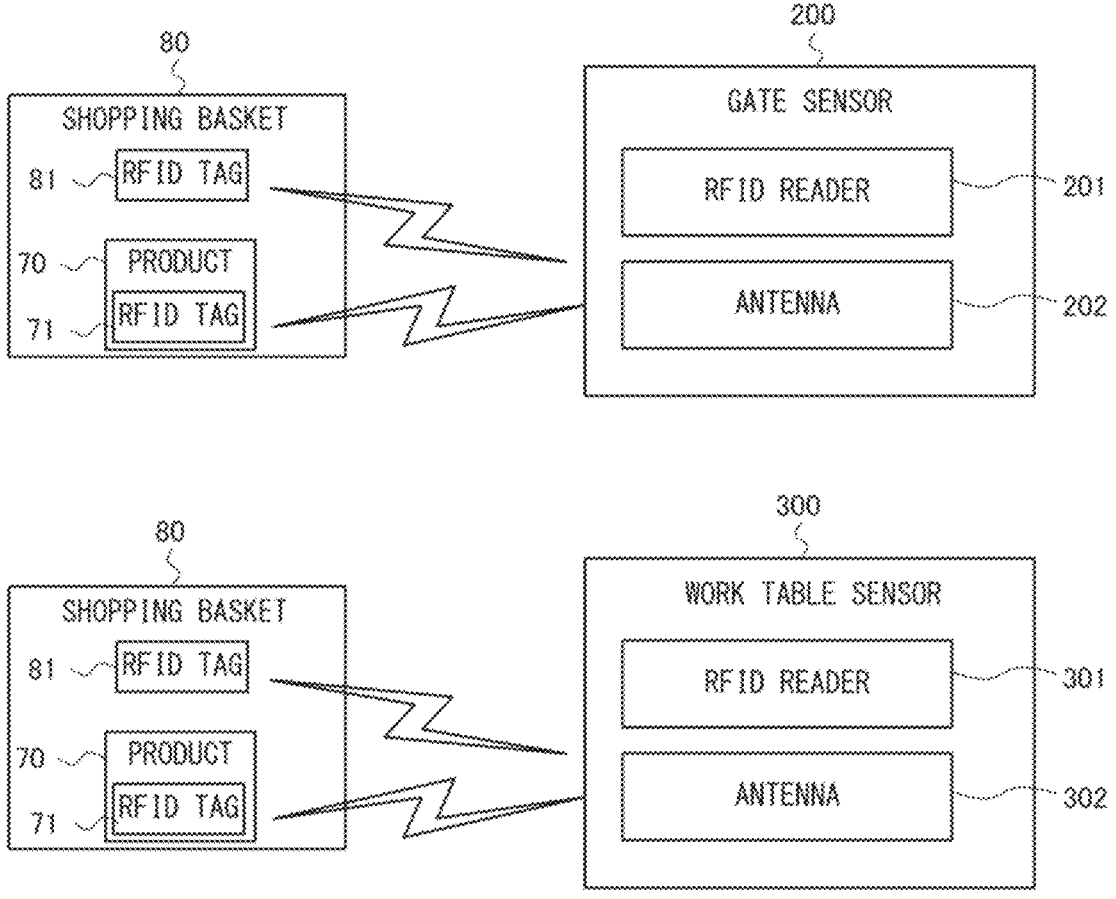
FIG. 6 is a block diagram illustrating a configuration example of a gate sensor and a configuration example of a work table sensor.

An RFID tag 71 is attached beforehand to a product 70 sold by a store 90, and the RFID tag 81 is also attached beforehand to a shopping basket 80 used in the store 90 (see FIG. 6). The RFID tag 71 of the product 70 and the RFID tag 81 of the shopping basket 80 can be read by a gate sensor 200 and a work table sensor 300. The RFID tag 71 is attached to any position (for example, an outer surface) of the product. In addition, similarly, the RFID tag 81 is also attached to any position (for example, an outer surface) of the shopping basket 80. By the way, in a case where the product 70 is present in the shopping basket 80, the RFID tag 71 of the product 70 may not be read appropriately by the sensor. This occurs resulting from, for example, the fact that a plurality of products 70 are stored and piled up in the shopping basket 80, and the radio waves used for reading are disturbed by the product 70 containing metal, the product 70 containing liquid, or the like. On the other hand, the radio waves for the RFID tag 81 of the shopping basket 80 are not disturbed by the product 70 in the shopping basket 80, missing of reading is unlikely to occur. Note that the RFID tag 81 may be provided on a plurality of surfaces (for example, a plurality of side surfaces) of the shopping basket 80 so that missing of reading the RFID tag 81 does not occur.

At least the product identification information is stored in the RFID tag 71 of the product 70. The product identification information stored in the RFID tag 71 is an identifier for identifying the product 70, to which the RFID tag 71 is attached. Different pieces of product identification information are respectively assigned to the products 70, which are sold by the store 90. In addition, at least the basket identification information is stored in the RFID tag 81 of the shopping basket 80. The basket identification information stored in the RFID tag 81 is an identifier for identifying the shopping basket 80, to which the RFID tag 81 is attached. Different pieces of basket identification information are respectively assigned to the shopping baskets 80, which are used in the store 90.

Figure 4:
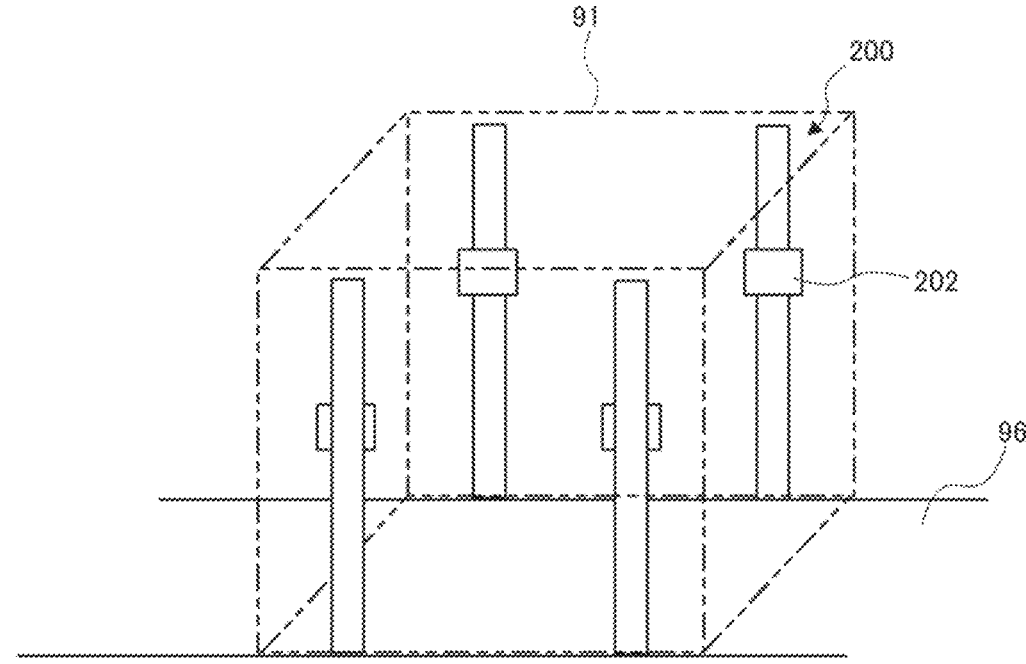
FIG. 4 is a schematic diagram illustrating an example of a walk-through gate.

FIG. 4 is a schematic diagram illustrating an example of the walk-through gate 91. In an example illustrated in FIG. 4, antennas 202 of the gate sensor 200 are provided on both sides of a passage 96, through which the shopper passes, and thus the walk-through gate 91 is configured. Note that in a configuration example illustrated in FIG. 4, two antennas 202 are provided on each of both sides of the passage 96, but the number of antennas 202 is not limited to the configuration example illustrated in FIG. 4. Further, the antennas 202 may be provided only on one side of the passage 96.

Figure 5:
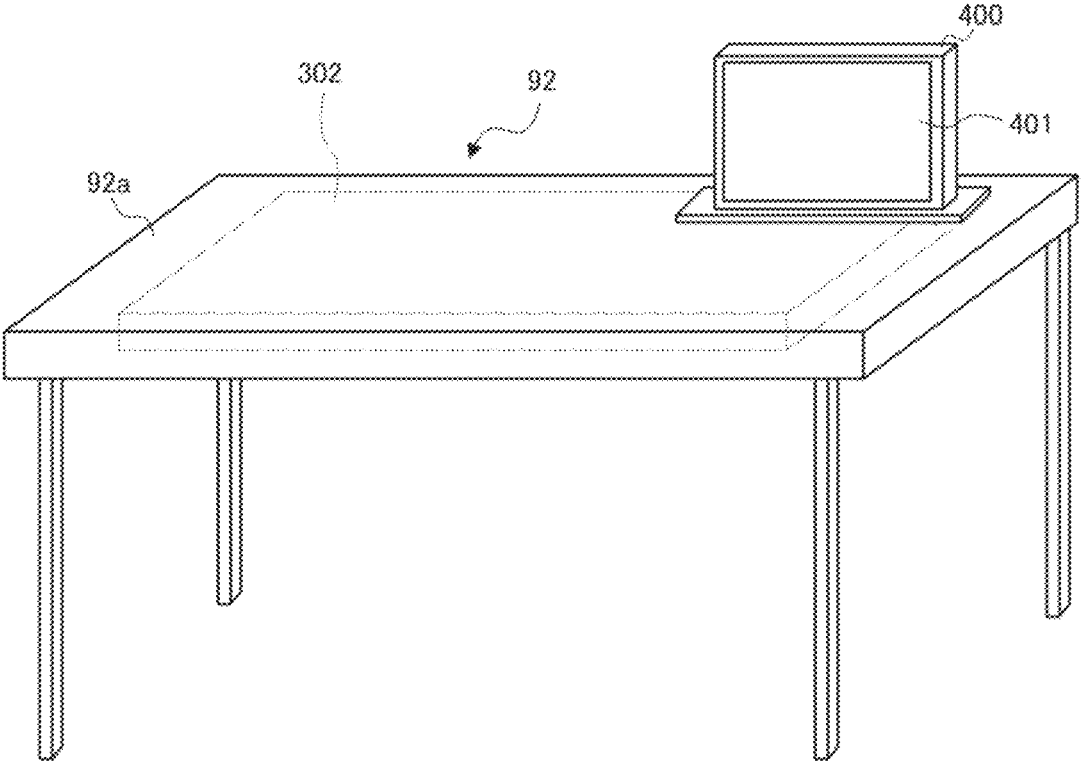
FIG. 5 is a schematic diagram illustrating an example of a work table.

FIG. 5 is a schematic diagram illustrating an example of the work table 92. A work table sensor 300 including an antenna 302 is built in a top plate 92*a* of the work table 92, and an RFID tag in a space above the top plate 92*a* is read. For example, the shopper places the shopping basket 80 containing the product 70 to be purchased on the top plate 92*a* of the work table 92, and puts the product 70 into the bag by hand on the top plate 92*a* (the antenna 302 of the work table sensor 300). As illustrated in FIG. 5, the payment terminal 400 is also provided on the work table 92. The payment terminal 400 includes an input device and an output device (a display) in order to enable accepting of an instruction from a user and displaying of information. In an example illustrated in FIG. 5, the payment terminal 400 includes a touch panel 401 as the input device and the output device.

FIG. 6 is a block diagram illustrating an example configuration of the gate sensor 200 and an example configuration of the work table sensor 300. As illustrated in FIG. 6, the gate sensor 200 includes an RFID reader 201 and an antenna 202. Similarly, the work table sensor 300 includes an RFID reader 301 and an antenna 302.

The RFID reader 201 serves as a control circuit that communicates with the RFID tags 71 and 81 via the antenna 202 in accordance with a predetermined communication protocol and that reads information stored in the RFID tag 71 of the product 70 and the RFID tag 81 of the shopping basket 80. The RFID reader 201 outputs pieces of information that have been read from the RFID tags 71 and 81 to the management apparatus 100. The antenna 202 is installed at a position where radio waves can be transmitted and received to and from the RFID tags 71 and 81, which pass through the walk-through gate 91, transmits radio waves toward the RFID tags 71 and 81, and receives the radio waves transmitted from the RFID tags 71 and 81. Note that with regard to the antenna 202, an antenna for transmission and an antenna for reception may be provided individually.

Similarly, the RFID reader 301 serves as a control circuit that communicates with the RFID tags 71 and 81 via the antenna 302 in accordance with a predetermined communication protocol, and reads information stored in the RFID tag 71 of the product 70 and the RFID tag 81 of the shopping basket 80. The RFID reader 301 outputs pieces of information that have been read from the RFID tags 71 and 81 to the management apparatus 100. The antenna 302 is installed at a position where radio waves can be transmitted and received to and from the RFID tags 71 and 81 above the work table 92, transmits radio waves toward the RFID tags 71 and 81, and receives the radio waves transmitted from the RFID tags 71 and 81. Note that with regard to the antenna 302, an antenna for transmission and an antenna for reception may be provided individually.

Note that the RFID readers 201 and 301 may respectively measure received signal strength indicators (RSSIs) of the signals (response signals) from the RFID tags 71 and 81 that have been received by the antennas 202 and 302, and may output data of the RSSIs of the signals from the RFID tags 71 and 81 to the management apparatus 100. More specifically, the data of the RSSIs denotes data in which identifiers stored in the RFID tags 71 and 81 that have transmitted signals are respectively associated with RSSI values.

Here, reading processing by the gate sensor 200 and reading processing by the work table sensor 300 have the following characteristics. In the reading processing by the gate sensor 200, a plurality of products 70 are likely to be gathered and present in the shopping basket 80. Hence, missing of reading the RFID tag 71 of the product 70 may occur. On the other hand, the gate sensor 200 is provided in the walk-through gate 91, which guides the moving routes of the shoppers. Hence, in the reading processing for a certain shopper, there is a low possibility that the RFID tag of another shopper is also read. That is, the gate sensor 200 has a low possibility of reading an RFID tag that should not be read. In order not to read the RFID tag that should not be read, a readable range may be narrowed by suppressing the transmission power of the radio waves output from the antenna 202. Hereinafter, reading an RFID tag that should not be read will be referred to as overreading. In this manner, it can be said that the gate sensor 200 is a sensor having a higher possibility that missing of reading occurs than a possibility that overreading occurs. Note that the gate sensor 200 can also be regarded as a sensor by which missing of reading may occur but overreading does not occur.

On the other hand, in the reading processing by the work table sensor 300, missing of reading the RFID tag 71 of the product 70 due to the radio waves being disturbed by another product 70 does not occur. This reason is as follows. On the work table 92, the shopper stores the products 70 into the bag. In this situation, a small number of products 70 are held by hand, and are moved into the bag. For example, the shopper stores the products 70 in the shopping basket 80 one by one into the bag. Here, the RFID tag 71, which is attached to the product 70 held by hand, is capable of transmitting and receiving the radio waves without being disturbed by another product 70. Accordingly, in the reading processing by the work table sensor 300, missing of reading the RFID tag 71 of the product 70 due to the radio waves being disturbed by another product 70 does not occur. However, overreading is likely to occur in the reading processing by the work table sensor 300. This is because the radio waves are output from the antenna 302 in order to read the RFID tags 71 of all the products 70 to be purchased without omission, and an RFID tag 71 in the surroundings that should not be read also communicates with the antenna 302. In particular, in a case where adjacent work tables 92 are close to each other, or in a case where while the shopper is doing some work on a certain work table 92 and another shopper passes by such a work table 92, overreading will occur. In this manner, it can be said that the work table sensor 300 is a sensor having a higher possibility that overreading occurs than a possibility that missing of reading occurs. Note that the work table sensor 300 can also be regarded as a sensor by which overreading may occur but missing of reading does not occur.

Returning to FIG. 2, the component elements in the information processing system 10 will be continuously described. The DB server 500 is a database server that stores information about the products 70. For example, the DB server 500 manages the product identification information of all the products 70 sold in the store 90. For example, the DB server 500 may manage the basket identification information of all the shopping baskets 80 used in the store 90. In addition, the DB server 500 may manage a payment record of every product (a record of whether a product has been purchased and paid). Note that in the configuration illustrated in FIG. 2, the management apparatus 100 communicates with the DB server 500, and accesses the information managed in a database. However, the management apparatus 100 may include such a database. That is, the DB server 500 may be omitted in the information processing system 10.

Figure 7:
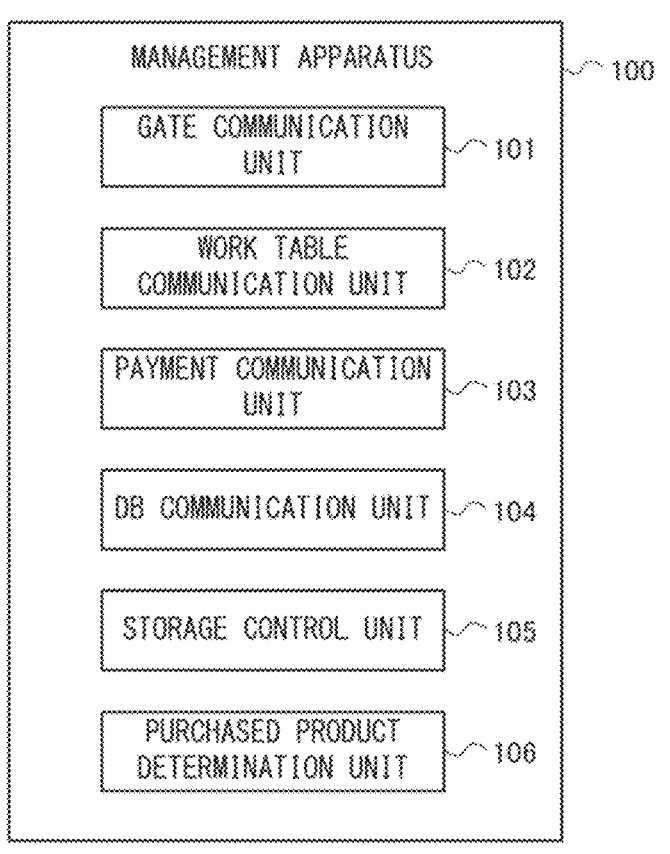
FIG. 7 is a block diagram illustrating an example of a functional configuration of a management apparatus.

The management apparatus 100 corresponds to the information processing apparatus 1 of FIG. 1, and is a device that determines a purchased product, based on reading results of the gate sensor 200 and the work table sensor 300. In the following, details of the management apparatus 100 will be described. FIG. 7 is a block diagram illustrating an example of a functional configuration of the management apparatus 100. As illustrated in FIG. 7, the management apparatus 100 includes a gate communication unit 101, a work table communication unit 102, a payment communication unit 103, a DB communication unit 104, a storage control unit 105, and a purchased product determination unit 106.

The gate communication unit 101 performs communication processing with each gate sensor 200. In particular, the gate communication unit 101 acquires information that has been read by the gate sensor 200. Specifically, the gate communication unit 101 acquires the product identification information stored in the RFID tag 71 attached to the product 70 and the basket identification information stored in the RFID tag 81 attached to the shopping basket 80. In this manner, the gate communication unit 101 corresponds to the gate data acquisition unit 2 in FIG. 1. Note that the gate communication unit 101 may acquire the information stored in the RFID tags 71 and 81 together with the RSSIs that have been measured by the gate sensor 200.

The work table communication unit 102 performs communication processing with each work table sensor 300. In particular, the work table communication unit 102 acquires information that has been read by the work table sensor 300. Specifically, the work table communication unit 102 acquires the product identification information stored in the RFID tag 71 attached to the product 70 and the basket identification information stored in the RFID tag 81 attached to the shopping basket 80. In this manner, the work table communication unit 102 corresponds to the work table data acquisition unit 4 in FIG. 1. Note that the work table communication unit 102 may acquire the information stored in the RFID tags 71 and 81 together with the RSSIs that have been measured by the work table sensor 300.

The payment communication unit 103 performs communication processing with each payment terminal 400. For example, the payment communication unit 103 performs processing of transmitting information to be displayed on the payment terminal 400 and processing of acquiring instruction information from the user that has been received by the payment terminal 400.

The DB communication unit 104 performs communication processing with the DB server 500. For example, the DB communication unit 104 performs processing of acquiring information stored in the DB server 500 and processing of updating information stored in the DB server 500.

The storage control unit 105 controls the information that has been acquired by the gate communication unit 101 to be stored in a storage device. In the present example embodiment, such a storage device is a memory 151, to be described later, included in the management apparatus 100, but another storage device such as the DB server 500 may be used. In a case where the basket identification information and the product identification information are read together by the gate sensor 200, the storage control unit 105 controls these pieces of information to be stored in the storage device in association with each other. In this manner, the storage control unit 105 corresponds to the storage control unit 3 in FIG. 1.

The purchased product determination unit 106 determines whether the product identified by the product identification information that has been read by the work table sensor 300 is a product to be purchased. The purchased product determination unit 106 makes this determination, based on the basket identification information that has been read by the work table sensor 300 and the information stored in the storage device in accordance with the above-described control by the storage control unit 105. In this manner, the purchased product determination unit 106 corresponds to the purchased product determination unit 5 in FIG. 1. Specifically, the purchased product determination unit 106 makes determination as follows.

In a case where the product identification information of a product to be determined is stored in the storage device in association with the basket identification information that has been read by the work table sensor 300 together with the product identification information of such a product to be determined, the purchased product determination unit 106 determines that the product to be determined is the product to be purchased. Accordingly, in a case where the product 70 to be determined that has been read together with a certain shopping basket 80 on the work table 92 has also been read together with such a certain shopping basket 80 in the walk-through gate 91, it is possible to automatically determine that such a product is the product to be purchased.

In addition, in a case where the product identification information of the product to be determined is stored in the storage device in association with basket identification information different from the basket identification information that has been read by the work table sensor 300 together with the product identification information of the product to be determined, the purchased product determination unit 106 determines that the product to be determined is not the product to be purchased. Accordingly, in a case where the product 70 to be determined that has been read together with a certain shopping basket 80 on the work table 92 had also been read together with another shopping basket 80 in the walk-through gate 91, it is possible to automatically determine that such a product is not the product to be purchased. Therefore, even though overreading the product identification information by the work table sensor 300 occurs, it is possible to determine that the product corresponding to such product identification information is not the product to be purchased.

In addition, in a case where the product identification information of the product to be determined is not stored in the storage device, the purchased product determination unit 106 determines whether the product to be determined is the product to be purchased in accordance with an instruction from a shopper. In this case, for example, the payment communication unit 103 performs communication processing so as to display a product that necessitates the instruction from the shopper on the payment terminal 400. Further, the payment communication unit 103 performs communication processing of acquiring the instruction of the shopper for the product that has been input into the payment terminal 400, that is, an instruction indicating whether an inquired product is the product to be purchased. The purchased product determination unit 106 thus determines whether the product to be determined is the product to be purchased in accordance with the instruction that has been acquired. That is, upon receipt of an instruction indicating that the inquired product is the product to be purchased, the purchased product determination unit 106 determines that such a product is the product to be purchased. On the other hand, upon receipt of an instruction indicating that the inquired product is not the product to be purchased, the purchased product determination unit 106 determines that such a product is not the product to be purchased. Accordingly, in a case where the product 70 to be determined that has been read on the work table 92 had not been read in the walk-through gate 91, it is possible to determine whether such a product is the product to be purchased in accordance with an instruction from the shopper. Therefore, even though missing of reading the product identification information by the gate sensor 200 occurs, it is possible to appropriately determine whether the product corresponding to the product identification information is the product to be purchased.

Figure 8:
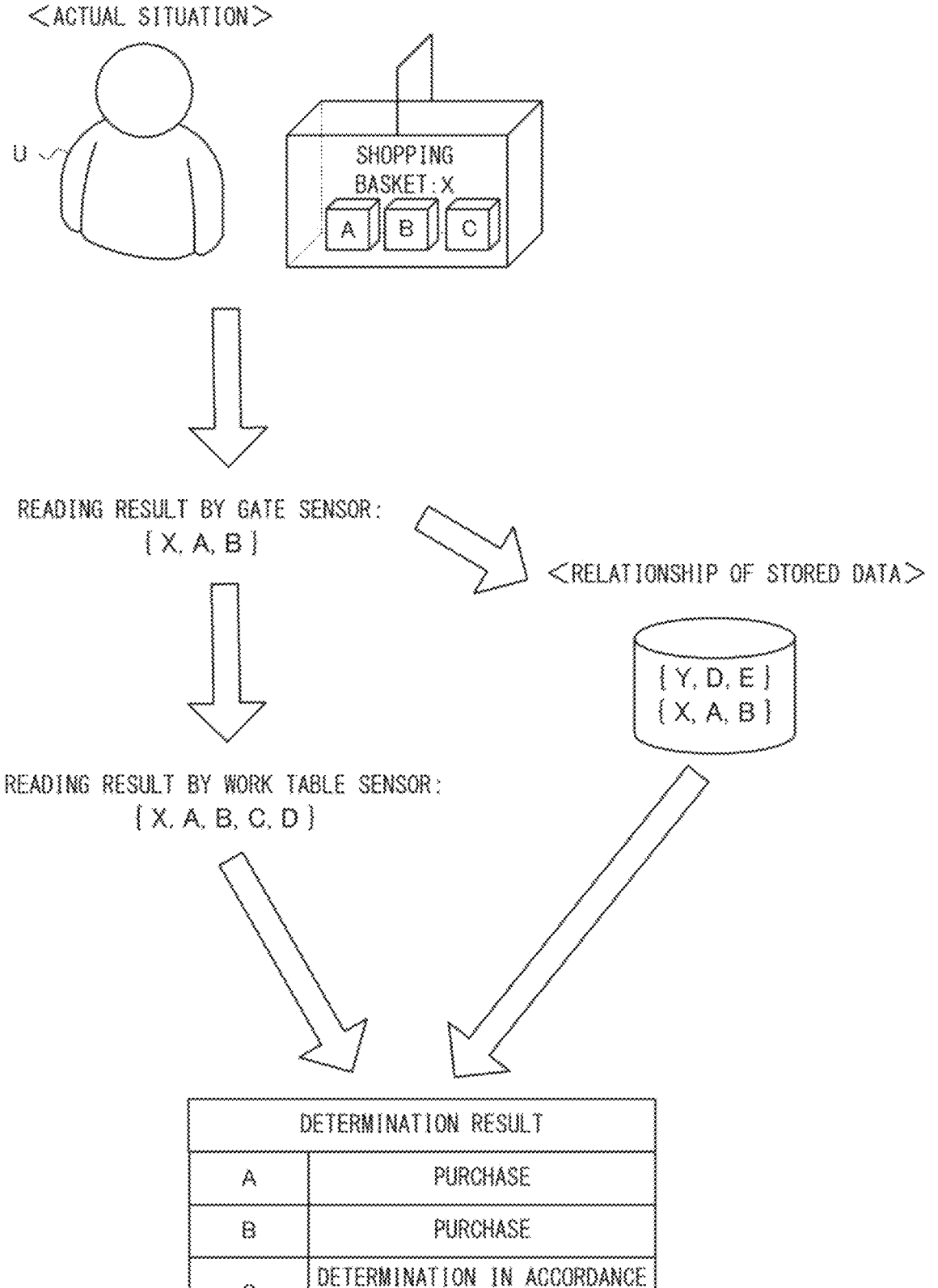
FIG. 8 is a diagram for describing determination by a purchased product determination unit.

The determination by the purchased product determination unit 106 that has been described above will be described with reference to the drawings. FIG. 8 is a diagram for describing the determination by the purchased product determination unit 106. Here, as an example, as illustrated in FIG. 8, a shopper U has a shopping basket (hereinafter, referred to as a shopping basket X) to be identified by basket identification information X, in which products (hereinafter, referred to as a product A, a product B, and a product C) to be respectively identified by product identification information A, B, and C are included. Then, it is assumed that the shopper U has passed through the walk-through gate 91, and thus the shopping basket X and the products A and B have been read by the gate sensor 200. That is, it is assumed that missing of reading the product C by the gate sensor 200 has occurred. As a result of reading by the gate sensor 200, the storage control unit 105 stores X, A, and B in the storage device in association with each other. Note that here, in addition to X, A, and B in association with each other, it is assumed that another shopper has passed through the walk-through gate 91 and Y, D, and E in association with each other are also stored in the storage device. Note that Y denotes basket identification information, and D and E each denote product identification information. A shopping basket identified by the basket identification information Y will be referred to as a shopping basket Y. Similarly, products identified by the product identification information D and E will be respectively referred to as products D and E. Furthermore, it is assumed that when the shopper U moves the products A, B, and C in the shopping basket X into a bag on the work table 92, the work table sensor 300 reads X, A, B, C, and D. That is, it is assumed that overreading the product D by the work table sensor 300 has occurred. In this case, the purchased product determination unit 106 determines whether the products A, B, C, and D that have been read by the work table sensor 300 are products to be purchased as follows (see a table in FIG. 8).

The purchased product determination unit 106 determines the product A as follows. The product A has been read by the work table sensor 300 together with the shopping basket X. Then, the product A is associated with the shopping basket X in the storage device. Accordingly, the purchased product determination unit 106 determines that the product A is a product to be purchased. Similarly, the purchased product determination unit 106 determines the product B as follows. The product B has been read by the work table sensor 300 together with the shopping basket X. Then, the product B is associated with the shopping basket X in the storage device. Accordingly, the purchased product determination unit 106 determines that the product B is a product to be purchased.

In addition, the purchased product determination unit 106 determines the product C as follows. The product C has been read by the work table sensor 300 together with the shopping basket X. However, the product C is not stored in the storage device. Accordingly, the purchased product determination unit 106 inquires of the shopper U whether the product C is a product to be purchased, and makes determination in accordance with an inquiry result.

In addition, the purchased product determination unit 106 determines the product D as follows. The product D has been read by the work table sensor 300 together with the shopping basket X. However, the product D is associated with the shopping basket Y in the storage device. Accordingly, the purchased product determination unit 106 determines that the product D is not a product to be purchased.

In an example illustrated in FIG. 8, the shopper U uses one shopping basket. However, in a case where the shopper U uses a plurality of shopping baskets, it is possible to make determination in a similar manner.

Note that in the above example, the shopper U uses the shopping basket. However, the shopper U does not use the shopping basket, in some cases. In such cases, the purchased product determination unit 106 determines whether the product to be determined is the product to be purchased, based on an instruction from the shopper. Specifically, in a case where the basket identification information has not been read by the work table sensor 300 together with the product identification information of the product to be determined, the purchased product determination unit 106 determines whether the product to be determined is the product to be purchased in accordance with the instruction from the shopper. Accordingly, also in a case where the shopper does not use the shopping basket, it is possible to make determination appropriately.

Figure 9:
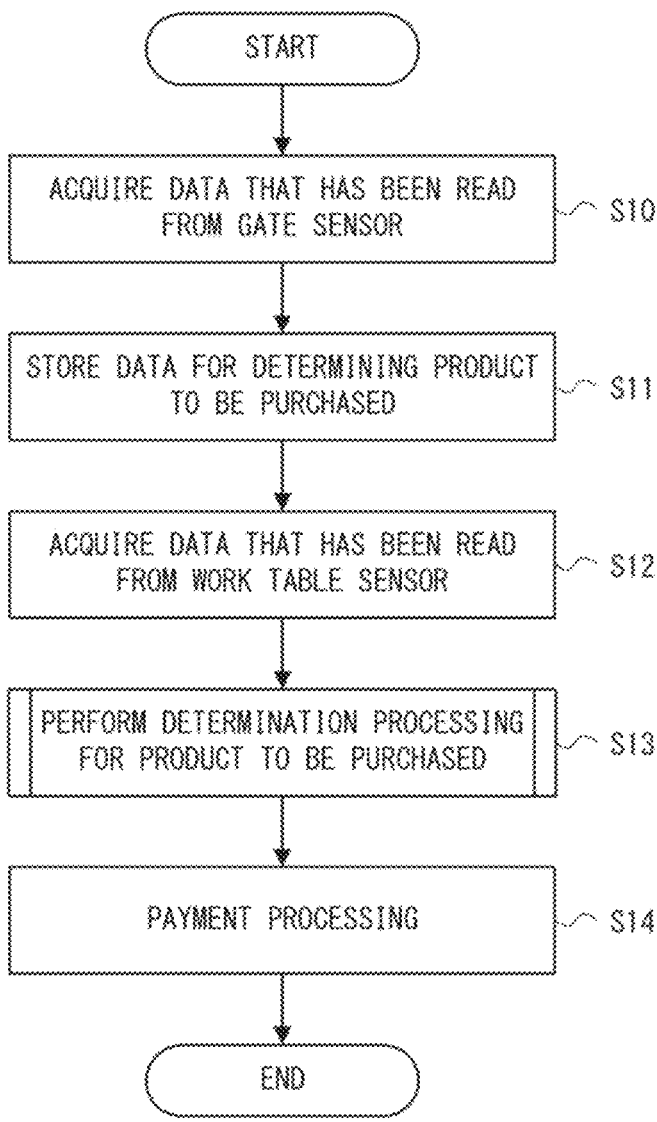
FIG. 9 is a flowchart illustrating an example of an operation flow of the information processing system for purchase determination.

Next, an operation flow by the information processing system 10 will be described. FIG. 9 is a flowchart illustrating an example of the operation flow by the information processing system 10 for purchase determination. Hereinafter, the operation flow will be described with reference to FIG. 9.

A shopper passes through the walk-through gate 91, and in step S10, the gate communication unit 101 acquires data that has been read by the gate sensor 200. Specifically, the gate communication unit 101 acquires the product identification information stored in the RFID tag 71 attached to the product 70 and the basket identification information stored in the RFID tag 81 attached to the shopping basket 80.

Next, in step S11, the storage control unit 105 controls the data acquired in step S10 to be stored in the storage device in order to determine a product to be purchased. In particular, in a case where the basket identification information and the product identification information are read together by the gate sensor 200, the storage control unit 105 controls these pieces of information to be stored in the storage device in association with each other.

Then, the shopper who has passed through the walk-through gate 91 comes to the work table 92, and in step S12, the work table communication unit 102 acquires data that has been read by the work table sensor 300. Specifically, the work table communication unit 102 acquires the product identification information stored in the RFID tag 71 attached to the product 70 and the basket identification information stored in the RFID tag 81 attached to the shopping basket 80.

Next, in step S13, the purchased product determination unit 106 performs determination processing for a product to be purchased. Note that details of the processing in step S13 will be described with reference to FIG. 10.

The determination processing for the product to be purchased ends, and in step S14, the payment processing is performed in the payment terminal 400. In the payment processing, a payment is made for the product that has been determined to be the product to be purchased. Then, with regard to the product for which the payment has been completed, the DB communication unit 104 transmits, to the DB server 500, data indicating that the payment has been completed for the product. Accordingly, the data in the DB server 500 is updated.

Figure 10:
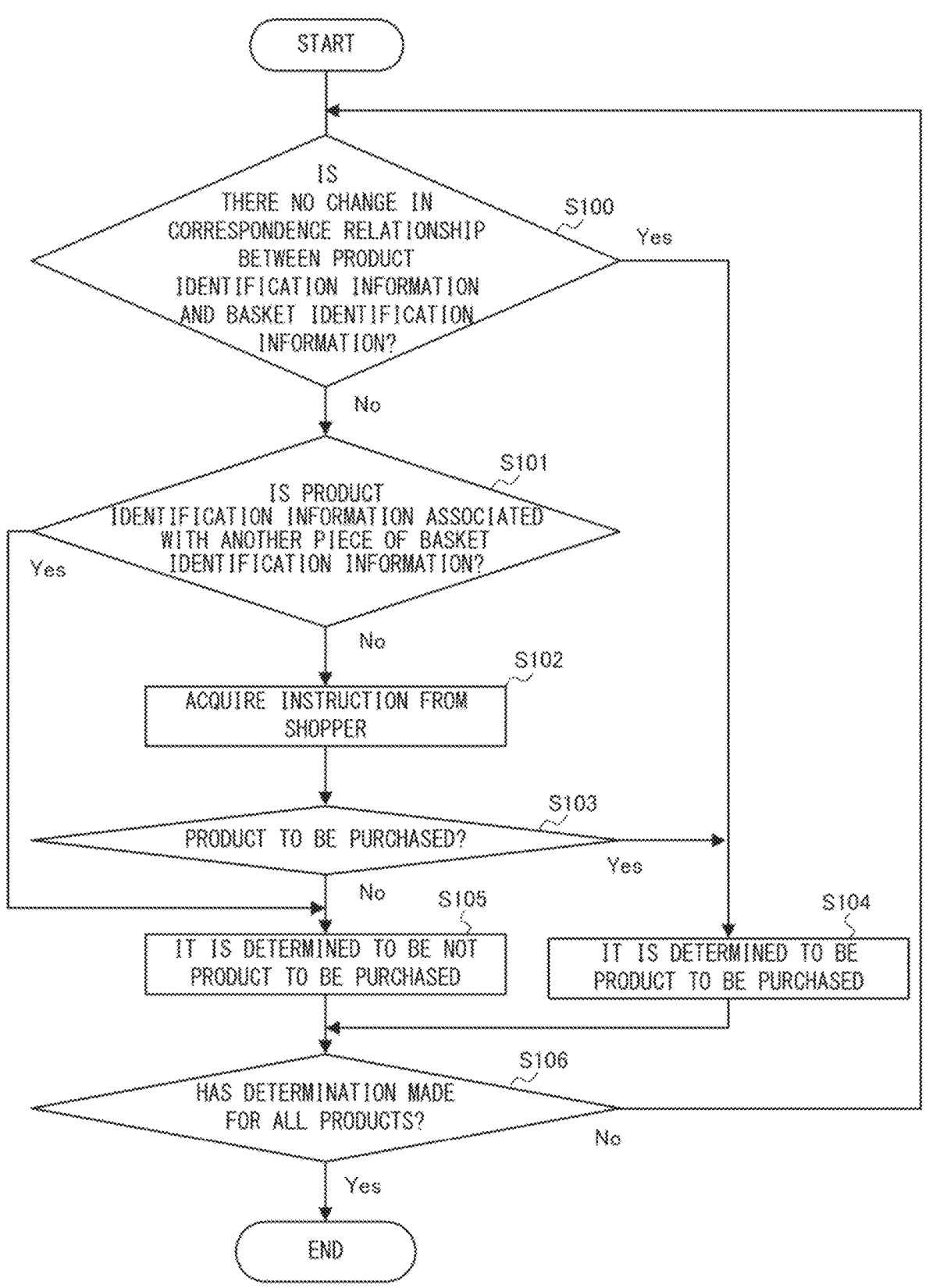
FIG. 10 is a flowchart illustrating an example of a flow for details of processing in step S13 in FIG. 9.

FIG. 10 is a flowchart illustrating an example of a detailed flow in the processing in step S13 of FIG. 9. Hereinafter, a flow of the determination processing for a product to be purchased will be described with reference to FIG. 10. The purchased product determination unit 106 determines the product that has been read by the work table sensor 300 in sequence as follows.

In step S100, the purchased product determination unit 106 checks whether a correspondence relationship between the product identification information and the basket identification information is changed between a reading result by the gate sensor 200 and a reading result by the work table sensor 300. In a case where the correspondence relationship between them is not changed, that is, in a case where the product identification information of the product to be determined is stored in the storage device in association with the basket identification information that has been read by the work table sensor 300 together with the product identification information of the product to be determined, the processing proceeds to step S104. On the other hand, in a case where the correspondence relationship between them is changed, the processing proceeds to step S101.

In step S101, the purchased product determination unit 106 checks whether the product identification information of the product to be determined is associated with another piece of basket identification information. That is, the purchased product determination unit 106 checks whether the product identification information of the product to be determined is stored in the storage device in association with basket identification information different from the basket identification information that has been read by the work table sensor 300 together with the product identification information of the product to be determined. In a case where the product identification information of the product to be determined is associated with another piece of basket identification information, the processing proceeds to step S105. On the other hand, in the other case, that is, in a case where the product identification information of the product to be determined is not stored in the storage device, the processing proceeds to step S102.

In step S102, the purchased product determination unit 106 acquires an instruction from the shopper. Then, in step S103, the purchased product determination unit 106 determines whether the instruction acquired in step S102 is an instruction indicating that the product to be determined is a product to be purchased. In a case where the instruction acquired in step S102 is the instruction indicating that the product to be determined is the product to be purchased, the processing proceeds to step S104. On the other hand, in a case where the instruction acquired in step S102 is an instruction indicating that the product to be determined is not the product to be purchased, the processing proceeds to step S105.

In step S104, the purchased product determination unit 106 determines that the product to be determined is the product to be purchased. On the other hand, in step S105, the purchased product determination unit 106 determines that the product to be determined is not the product to be purchased. After step S104 or step S105, the processing proceeds to step S106. In step S106, the purchased product determination unit 106 checks whether the determination has been made for all the products to be determined. In a case where the determination has been completed for all the products corresponding to the product identification information that has been read by the work table sensor 300, the determination processing ends, and in the other case, the processing returns to step S100.

Heretofore, the example embodiments have been described. According to the present example embodiments, it is possible to appropriately determine a product to be purchased while ensuring convenience.

Note that various modified examples are available for the determination processing for the product to be purchased described above. For example, the purchased product determination unit 106 may determine that a product that is not sold by the store 90 is not a product to be purchased. Accordingly, for example, even though the product identification information of the product sold in another store has been read, it is possible to make determination appropriately.

In addition, for example, even though overreading the basket identification information has occurred by the work table sensor 300, the purchased product determination unit 106 may perform the following determination processing in order to make determination appropriately.

For example, in a case where a plurality of pieces of basket identification information are read by the work table sensor 300 together with the product identification information of the product to be determined, and in a case where such a plurality of pieces of basket identification information are not read together by the gate sensor 200, the purchased product determination unit 106 may perform the following processing. That is, even though the shopper does not use a plurality of shopping baskets, in a case where the plurality of shopping baskets are detected on the work table 92, the following processing may be performed. In this case, the purchased product determination unit 106 excludes, from the basket identification information that has been read by the work table sensor 300, the basket identification information stored in the storage device in association with the product identification information of the product for which the payment has already been made out of the plurality of pieces of basket identification information, and makes determination. Note that it is possible to acquire the product identification information of the product for which the payment has already been made, by referring to, for example, the DB server 500. By performing such determination processing, in a case where overreading the shopping basket has occurred by the work table sensor 300, it is possible to suppress the product to be purchased from being erroneously determined. Such processing of the purchased product determination unit 106 will be described with reference to the drawings.

Figure 11:
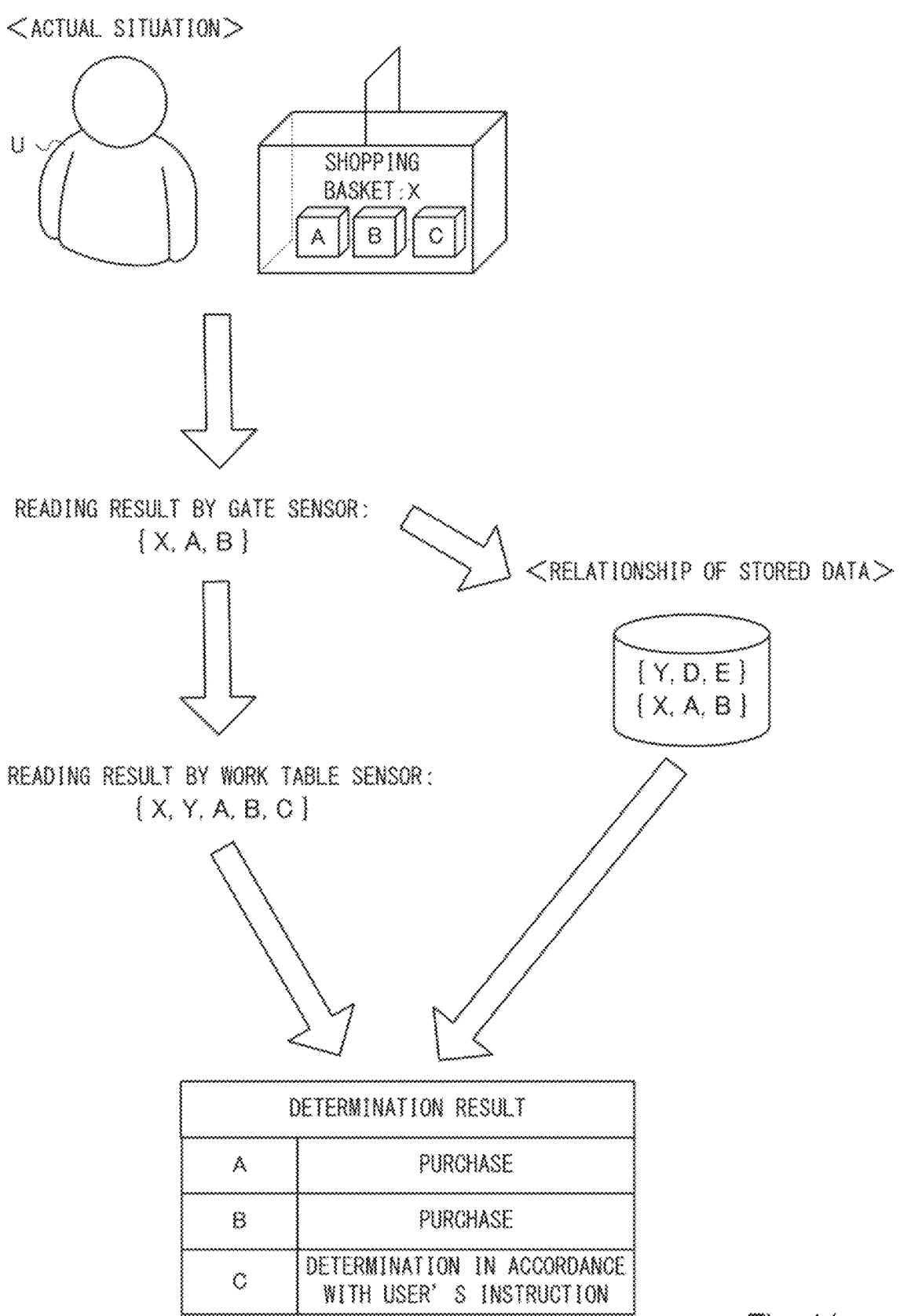
FIG. 11 is a diagram for describing the determination by the purchased product determination unit.

FIG. 11 is a diagram for describing the determination of the purchased product determination unit 106. Here, as an example, as illustrated in FIG. 11, a shopper U has a shopping basket (a shopping basket X) to be identified by basket identification information X, in which the products (a product A, a product B, and a product C) to be respectively identified by product identification information A, B, and C are included. Then, it is assumed that the shopper U has passed through the walk-through gate 91, and thus the shopping basket X and the products A and B have been read by the gate sensor 200. As a result of reading by the gate sensor 200, the storage control unit 105 stores X, A, and B in the storage device in association with each other. Note that here, in addition to X, A, and B in association with each other, it is assumed that another shopper has passed through the walk-through gate 91 and Y, D, and E in association with each other are also stored in the storage device. Furthermore, it is assumed that when the shopper U moves the products A, B, and C in the shopping basket X into a bag on the work table 92, the work table sensor 300 reads X, Y, A, B, and C. That is, it is assumed that overreading the shopping basket Y by the work table sensor 300 has occurred. In this case, the purchased product determination unit 106 determines whether the products A, B, and C that have been read by the work table sensor 300 are products to be purchased as follows (see a table in FIG. 11). Note that it is assumed that payments for the products D and E have already been made by another shopper.

In the example illustrated in FIG. 11, the plurality of pieces of basket identification information X and Y have been read by the work table sensor 300 together with the product identification information of the products to be determined, and the plurality of pieces of basket identification information X and Y have not been read together by the gate sensor 200. Accordingly, as described above, the purchased product determination unit 106 excludes, from the basket identification information that has been read by the work table sensor 300, the basket identification information Y stored in the storage device in association with the products D and E for which the payments have already been made out of the plurality of pieces of basket identification information X and Y, and makes determination. That is, the purchased product determination unit 106 ignores the basket identification information Y, and uses only the basket identification information X as the basket identification information that has been read by the work table sensor 300. In other words, the purchased product determination unit 106 performs the determination processing, assuming that only the basket identification information X has been read by the work table sensor 300 as the identification information of the shopping basket.

Accordingly, the purchased product determination unit 106 determines the product A as follows. The product A has been read together with the shopping basket X by the work table sensor 300, and is associated with the shopping basket X in the storage device. Therefore, the purchased product determination unit 106 determines that the product A is a product to be purchased. The purchased product determination unit 106 determines the product B in a similar manner. In addition, the purchased product determination unit 106 determines the product C as follows. The product C has been read by the work table sensor 300 together with the shopping basket X, but is not associated with the shopping basket X in the storage device. Therefore, the purchased product determination unit 106 makes determination in accordance with an instruction from the shopper U.

Note that the purchased product determination unit 106 may determine that the product for which the payment has been made is not the product to be purchased. For example, in the example illustrated in FIG. 11, it is assumed that overreading the product D by the work table sensor 300 has occurred. In this case, the purchased product determination unit 106 may determine that the product D for which the payment has already been made by another shopper is not the product to be purchased by the shopper U.

Note that in the above-described determination of the product to be purchased, in a case where a payment has not been made yet for the shopping basket Y for which overreading has occurred, the determination may not be made appropriately. Accordingly, the determination may be made by use of the RSSI. For example, in a case where a plurality of pieces of basket identification information are read by the work table sensor 300 together with the product identification information of the product to be determined, and in a case where such a plurality of pieces of basket identification information are not read together by the gate sensor 200, the purchased product determination unit 106 may perform the following processing. In this case, the purchased product determination unit 106 excludes, from the basket identification information that has been read by the work table sensor 300, the basket identification information from which the RSSI of a signal that has been received for reading is equal to or smaller than a threshold out of the plurality of pieces of basket identification information, and makes determination. By making determination in this manner, even in a case where the payment has not been made yet for the shopping basket Y for which overreading has occurred, it is possible to appropriately determine a product to be purchased. This is because the shopping basket X, which is used by the shopper U, is read at a position sufficiently close to the work table sensor 300, whereas the shopping basket Y, which is not used by the shopper U, is read at a position relatively far from the work table sensor 300.

Figure 12:
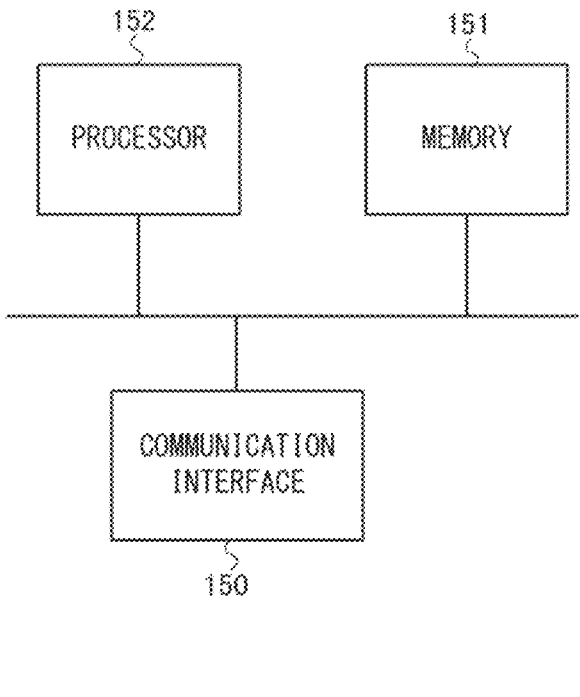
FIG. 12 is a schematic diagram illustrating an example of a hardware configuration of the management apparatus.

Note that the management apparatus 100 that has been described in the above-described example embodiments may be configured as a computer. FIG. 12 is a schematic diagram illustrating an example of a hardware configuration of the management apparatus 100. As illustrated in FIG. 12, the management apparatus 100 includes a communication interface 150, a memory 151, and a processor 152.

The communication interface 150 is used for communicating with other devices. For example, the communication interface 150 includes an interface for communicating with the gate sensor 200, an interface for communicating with the work table sensor 300, an interface for communicating with the payment terminal 400, and an interface for communicating with the DB server 500.

The memory 151 includes, for example, a combination of a volatile memory and a nonvolatile memory. The memory 151 is used for storing software (a computer program) including one or more instructions to be executed by the processor 152, data used for various processes of the management apparatus 100, and the like.

The processor 152 reads and executes the software (the computer program) from the memory 151 to perform processing of each component element illustrated in FIG. 7. The processor 152 may be, for example, a microprocessor, a micro processor unit (MPU), a central processing unit (CPU), or the like. The processor 152 may include a plurality of processors.

In this manner, the management apparatus 100 may have a function as a computer. In addition, the payment terminal 400 and the DB server 500 each may similarly include a processor and a memory, and may have a function as a computer. Note that the gate sensor 200 and the work table sensor 300 each may also include a processor and a memory, and may have a function as a computer. Therefore, the functions of the gate sensor 200 and the work table sensor 300 may be achieved by execution of a program by the processor. In this manner, it is understood by those skilled in the art that the functions of the information processing system 10 can be achieved in various forms by only hardware, only software, or a combination of them, without being limited to any one of them.

The program includes a group of instructions (or software codes) for causing a computer to perform one or more functions that have been described in the example embodiments, when the program is read by the computer. The program may be stored in a non-transitory computer-readable medium or a tangible storage medium. As an example and not by way of limitation, the computer-readable medium or the tangible storage medium includes a random-access memory (RAM), a read-only memory (ROM), a flash memory, a solid-state drive (SSD) or any other memory technology, a CD-ROM, a digital versatile disc (DVD), a Blu-ray (registered trademark) disc or any other optical disk storage, a magnetic cassette, a magnetic tape, a magnetic disk storage, and any other magnetic storage device. The program may be transmitted on a transitory computer-readable medium or a communication medium. As an example and not by way of limitation, the transitory computer-readable medium or the communication medium includes propagated signals in electrical, optical, acoustic, or any other form.

Note that the present invention is not limited to the above example embodiments, and can be appropriately changed without departing from the gist.

In addition, some or all of the above example embodiments may be described as the following supplementary notes, but are not limited to the following.
Supplementary Note 1

An information processing apparatus including:

gate data acquisition means for acquiring product identification information stored in an RFID tag attached to a product and basket identification information stored in an RFID tag attached to a shopping basket, the product identification information and the basket identification information having been read by a gate sensor that is a sensor provided at a gate through which a shopper passes;

storage control means for controlling the basket identification information and the product identification information that have been read together by the gate sensor to be stored in a storage device in association with each other;

work table data acquisition means for acquiring product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and purchased product determination means for determining whether the product to be identified by the product identification information that has been read by the work table sensor is the product to be purchased, based on the basket identification information that has been read by the work table sensor and information stored in the storage device.
Supplementary Note 2

The information processing apparatus described in the supplementary note 1, in which in a case where the product identification information of the product to be determined is stored in the storage device in association with the basket identification information that has been read by the work table sensor together with the product identification information of the product to be determined, the purchased product determination means determines that the product to be determined is the product to be purchased.
Supplementary Note 3

The information processing apparatus described in the supplementary note 1 or 2, in which in a case where the product identification information of the product to be determined is stored in the storage device in association with basket identification information different from the basket identification information that has been read by the work table sensor together with the product identification information of the product to be determined, the purchased product determination means determines that the product to be determined is not the product to be purchased.
Supplementary Note 4

The information processing apparatus described in any one of the supplementary notes 1 to 3, in which in a case where the product identification information of the product to be determined is not stored in the storage device, the purchased product determination means determines whether the product to be determined is the product to be purchased in accordance with an instruction from the shopper.
Supplementary Note 5

The information processing apparatus described in any one of the supplementary notes 1 to 4, in which in a case where the basket identification information has not been read by the work table sensor together with the product identification information of the product to be determined, the purchased product determination means determines whether the product to be determined is the product to be purchased in accordance with an instruction from the shopper.
Supplementary Note 6

The information processing apparatus described in any one of the supplementary notes 1 to 5, in which in a case where a plurality of pieces of basket identification information have been read by the work table sensor together with the product identification information of the product to be determined and the plurality of pieces of basket identification information have not been read together by the gate sensor, the purchased product determination means excludes, from the basket identification information that has been read by the work table sensor, basket identification information stored in the storage device in association with product identification information of a product for which payment has already been made out of the plurality of pieces of basket identification information, and makes determination.

Supplementary Note 7

The information processing apparatus described in any one of the supplementary notes 1 to 6, in which in a case where a plurality of pieces of basket identification information have been read by the work table sensor together with the product identification information of the product to be determined and the plurality of pieces of basket identification information have not been read together by the gate sensor, the purchased product determination means excludes, from the basket identification information that has been read by the work table sensor, basket identification information from which an RSSI of a signal that has been received for reading is equal to or smaller than a threshold out of the plurality of pieces of basket identification information, and makes determination.

Supplementary Note 8

An information processing system including:

a gate sensor that is a sensor provided at a gate through which a shopper passes;

a work table sensor that is a sensor provided in a work table on which the shopper puts a product to be purchased into a container used by the shopper to bring back the product from a store; and an information processing apparatus, in which the information processing apparatus includes:

gate data acquisition means for acquiring product identification information stored in an RFID tag attached to a product and basket identification information stored in an RFID tag attached to a shopping basket, the product identification information and the basket identification information having been read by the gate sensor;

storage control means for controlling the basket identification information and the product identification information that have been read together by the gate sensor to be stored in a storage device in association with each other;

work table data acquisition means for acquiring product identification information stored in an RFID tag attached to a product and basket identification information stored in an RFID tag attached to a shopping basket, the product identification information and the basket identification information having been read by the work table sensor; and purchased product determination means for determining whether the product to be identified by the product identification information that has been read by the work table sensor is the product to be purchased, based on the basket identification information that has been read by the work table sensor and information stored in the storage device.

Supplementary Note 9

The information processing system described in the supplementary note 8, in which the gate sensor is provided for each of a plurality of the gates.

Supplementary Note 10

The information processing system described in the supplementary note 8 or 9, in which the work table sensor is provided for each of a plurality of the work tables.

Supplementary Note 11

An information processing method including:

acquiring product identification information stored in an RFID tag attached to a product and basket identification information stored in an RFID tag attached to a shopping basket, the product identification information and the basket identification information having been read by a gate sensor that is a sensor provided at a gate through which a shopper passes;

controlling the basket identification information and the product identification information that have been read together by the gate sensor to be stored in a storage device in association with each other;

acquiring product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and determining whether the product to be identified by the product identification information that has been read by the work table sensor is the product to be purchased, based on the basket identification information that has been read by the work table sensor and information stored in the storage device.

Supplementary Note 12

A non-transitory computer-readable storage medium storing a program for causing a computer to execute processing including:

a gate data acquisition step of acquiring product identification information stored in an RFID tag attached to a product and basket identification information stored in an RFID tag attached to a shopping basket, the product identification information and the basket identification information having been read by a gate sensor that is a sensor provided at a gate through which a shopper passes;

a storage control step of controlling the basket identification information and the product identification information that have been read together by the gate sensor to be stored in a storage device in association with each other;

a work table data acquisition step of acquiring product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and a purchased product determination step of determining whether the product to be identified by the product identification information that has been read by the work table sensor is the product to be purchased, based on the basket identification information that has been read by the work table sensor and information stored in the storage device.

Heretofore, although the invention of the present application has been described with reference to the example embodiments, the invention of the present application is not limited to the above description. Various modifications that can be understood by those skilled in the art can be made to the configurations and details of the present invention within the scope of the invention.

This application claims priority based on Japanese Patent Application No. 2021-145360 filed Sep. 7, 2021, the entire disclosure of which is incorporated herein.

REFERENCE SIGNS LIST

1 INFORMATION PROCESSING APPARATUS
2 GATE DATA ACQUISITION UNIT
3 STORAGE CONTROL UNIT
4 WORK TABLE DATA ACQUISITION UNIT
5 PURCHASED PRODUCT DETERMINATION UNIT
10 INFORMATION PROCESSING SYSTEM
70 PRODUCT
71 RFID TAG
80 SHOPPING BASKET
81 RFID TAG
90 STORE
91 WALK-THROUGH GATE
92 WORK TABLE
92a TOP PLATE
95 PRODUCT DISPLAY AREA
96 PASSAGE
100 MANAGEMENT APPARATUS
101 GATE COMMUNICATION UNIT
102 WORK TABLE COMMUNICATION UNIT
103 PAYMENT COMMUNICATION UNIT
104 DB COMMUNICATION UNIT
105 STORAGE CONTROL UNIT
106 PURCHASED PRODUCT DETERMINATION UNIT
150 COMMUNICATION INTERFACE
151 MEMORY
152 PROCESSOR
200 GATE SENSOR
201 RFID READER
202 ANTENNA
300 WORK TABLE SENSOR
301 RFID READER
302 ANTENNA
400 PAYMENT TERMINAL
401 TOUCH PANEL
500 DB SERVER

What is claimed is:

1. An information processing apparatus comprising:
at least one memory storing instructions; and
at least one processor configured to execute the instructions to:
acquire product identification information stored in a radio frequency identifier (RFID) tag attached to a product and basket identification information stored in an RFID tag attached to a shopping basket, the product identification information and the basket identification information having been read together by a gate sensor that is a sensor provided at a gate through which a shopper passes;
control the basket identification information and the product identification information that have been read together by the gate sensor to be stored in a storage device in association with each other;
acquire product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and
determine whether the product to be identified by the product identification information that has been read by the work table sensor is the product to be purchased, based on the basket identification information that has been read by the work table sensor and information stored in the storage device;
wherein the processor is further configured to execute the instructions to;
determine, in a case where the product identification information of the product to be determined is stored in the storage device in association with the basket identification information that has been read by the work table sensor together with the product identification information of the product to be determined, that the product to be determined is the product to be purchased; and
in a case where a plurality of pieces of basket identification information have been read by the work table sensor together with the product identification information of the product to be determined and the plurality of pieces of basket identification information have not been read together by the gate sensor, exclude, from the basket identification information that has been read by the work table sensor, basket identification information stored in the storage device in association with product identification information of a product for which payment has already been made out of the plurality of pieces of basket identification information, and make determination.

2. The information processing apparatus according to claim 1,
wherein the processor is further configured to execute the instructions to determine, in a case where the product identification information of the product to be determined is stored in the storage device in association with basket identification information different from the basket identification information that has been read by the work table sensor together with the product identification information of the product to be determined, that the product to be determined is not the product to be purchased.

3. The information processing apparatus according to claim 1,
wherein the processor is further configured to execute the instructions to determine, in a case where the product identification information of the product to be determined is not stored in the storage device, whether the product to be determined is the product to be purchased in accordance with an instruction from the shopper.

4. The information processing apparatus according to claim 1,
wherein the processor is further configured to execute the instructions to determine, in a case where the basket identification information has not been read by the work table sensor together with the product identification information of the product to be determined, whether the product to be determined is the product to be purchased in accordance with an instruction from the shopper.

5. An information processing apparatus comprising:
at least one memory storing instructions; and
at least one processor configured to execute the instructions to:
acquire product identification information stored in a radio frequency identifier (RFID) tag attached to a product and basket identification information stored in an RFID tag attached to a shopping basket, the product identification information and the basket identification information having been read together by a gate sensor that is a sensor provided at a gate through which a shopper passes;

control the basket identification information and the product identification information that have been read together by the gate sensor to be stored in a storage device in association with each other;

acquire product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and determine whether the product to be identified by the product identification information that has been read by the work table sensor is the product to be purchased, based on the basket identification information that has been read by the work table sensor and information stored in the storage device, wherein the processor is further configured to execute the instructions to:

determine, in a case where the product identification information of the product to be determined is stored in the storage device in association with the basket identification information that has been read by the work table sensor together with the product identification information of the product to be determined, that the product to be determined is the product to be purchased; and in a case where a plurality of pieces of basket identification information have been read by the work table sensor together with the product identification information of the product to be determined and the plurality of pieces of basket identification information have not been read together by the gate sensor, exclude, from the basket identification information that has been read by the work table sensor, basket identification information from which a received signal strength indicators (RSSI) of a signal that has been received for reading is equal to or smaller than a threshold out of the plurality of pieces of basket identification information, and make determination.

6. An information processing method comprising:

acquiring product identification information stored in an RFID tag attached to a product and basket identification information stored in an RFID tag attached to a shopping basket, the product identification information and the basket identification information having been read together by a gate sensor that is a sensor provided at a gate through which a shopper passes;

controlling the basket identification information and the product identification information that have been read together by the gate sensor to be stored in a storage device in association with each other;

acquiring product identification information stored in an RFID tag attached to a product and basket identification information stored in an RFID tag attached to a shopping basket, the product identification information and the basket identification information having been read by a work table sensor that is a sensor provided in a work table on which the shopper puts the product to be purchased into a container used by the shopper to bring back the product from a store; and determining whether the product to be identified by the product identification information that has been read by the work table sensor is the product to be purchased, based on the basket identification information that has been read by the work table sensor and information stored in the storage device, wherein it is determined, in a case where the product identification information of the product to be determined is stored in the storage device in association with the basket identification information that has been read by the work table sensor together with the product identification information of the product to be determined, that the product to be determined is the product to be purchased, and in a case where a plurality of pieces of basket identification information have been read by the work table sensor together with the product identification information of the product to be determined and the plurality of pieces of basket identification information have not been read together by the gate sensor, exclude, from the basket identification information that has been read by the work table sensor, basket identification information stored in the storage device in association with product identification information of a product for which payment has already been made out of the plurality of pieces of basket identification information, and make determination.

* * * * *